(12) United States Patent
Maki et al.

(10) Patent No.: US 9,581,194 B2
(45) Date of Patent: Feb. 28, 2017

(54) MOTION GUIDE DEVICE

(71) Applicant: THK CO., LTD., Tokyo (JP)

(72) Inventors: Nobuyuki Maki, Tokyo (JP); Fukuji Nakano, Tokyo (JP); Shigemi Nakamura, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 14/765,379

(22) PCT Filed: Dec. 5, 2013

(86) PCT No.: PCT/JP2013/082714
§ 371 (c)(1),
(2) Date: Aug. 3, 2015

(87) PCT Pub. No.: WO2014/119122
PCT Pub. Date: Aug. 7, 2014

(65) Prior Publication Data
US 2015/0362014 A1 Dec. 17, 2015

(30) Foreign Application Priority Data
Feb. 4, 2013 (JP) ................................. 2013-019154

(51) Int. Cl.
*F16C 29/06* (2006.01)

(52) U.S. Cl.
CPC ...... *F16C 29/0611* (2013.01); *F16C 29/0609* (2013.01); *F16C 29/0647* (2013.01); *F16C 29/0664* (2013.01)

(58) Field of Classification Search
CPC .......................... F16C 29/0602–29/0611; F16C 29/0633–29/0666
See application file for complete search history.

(56) References Cited

U.S. PATENT DOCUMENTS

| 6,132,093 A * | 10/2000 | Michioka | F16C 29/0607 384/45 |
| 7,802,921 B2 * | 9/2010 | Wu | F16C 29/0611 384/44 |

(Continued)

FOREIGN PATENT DOCUMENTS

| DE | 102004050818 | * | 5/2006 |
| JP | 59-181331 U | | 12/1984 |

(Continued)

OTHER PUBLICATIONS

International Search Report dated Mar. 4, 2014, issued in counterpart application No. PCT/JP2013/082714 (2 pages).

(Continued)

*Primary Examiner* — James Pilkington
(74) *Attorney, Agent, or Firm* — Westerman, Hattori, Daniels & Adrian, LLP (57) ABSTRACT

Provided is a motion guide device in which a moving member is equipped with circulation path moldings. With the device, ease of assembly and moldability can be improved. A moving member is provided with circulation path moldings, which have: holding sections that extend along loaded rolling-element rolling sections; return path configuring sections that configure return paths; and a pair of direction-change path inner circumference configuring sections that configure the inner circumferences of a pair of direction-change paths. The circulation path moldings are provided with a first molding in which one direction-change path inner circumference configuring sections is integrally molded with the holding section and a second molding in which the other direction-change path inner circumference configuring section is integrally molded with the return path configuring section. The first molding and the second molding are separate bodies.

6 Claims, 12 Drawing Sheets

(56) References Cited

U.S. PATENT DOCUMENTS

| | | |
|---|---|---|
| 2001/0048775 A1 | 12/2001 | Michioka et al. |
| 2006/0029305 A1 | 2/2006 | Akiyama et al. |
| 2008/0138002 A1 | 6/2008 | Yamaguchi et al. |

FOREIGN PATENT DOCUMENTS

| | | |
|---|---|---|
| JP | 11-72119 A | 3/1999 |
| JP | 2005-264984 A | 9/2005 |
| JP | 2007-303556 A | 11/2007 |
| TW | M282068 U | 12/2005 |

OTHER PUBLICATIONS

Office Action dated Jul. 18, 2016, issued in corresponding Chinese Application No. 201380072044.9, with English translation. (9 pages).

\* cited by examiner

MOTION GUIDE DEVICE

TECHNICAL FIELD

The present specification is based on Japanese Patent Application No. 2013-019154 filed on Feb. 4, 2013, the description of which is all incorporated herein.

The present invention relates to a motion guide device in which a moving member is assembled to a track member with a plurality of rolling elements equipped therebetween so that the moving member is movable along the track member, and in particular relates to a motion guide device in which a circulation path molding configuring a circulation path is incorporated into the moving member.

BACKGROUND ART

A motion guide device is used for highly accurately guiding an object to be guided, such as a table, in making a linear motion or a curvilinear motion. A motion guide device includes a track member, and a moving member which is movably assembled to the track member via a plurality of rolling elements. When the moving member moves along the track member, the rolling elements make a rolling motion between the members to thereby allow the moving member to achieve a swift motion.

The track member is provided with a rolling-element rolling section extending in a longitudinal direction. The moving member is provided with a loaded rolling-element rolling section opposed to the rolling-element rolling section of the track member, a return path parallel to the loaded rolling-element rolling section, a loaded rolling-element rolling path provided between the rolling-element rolling section and the loaded rolling-element rolling section, and a circulation path including a pair of direction-change paths connected to the return path. As a kind of a motion guide device, there is proposed a motion guide device in which a circulation path is configured by a circulation path molding and the circulation path molding is incorporated into a moving member to facilitate manufacture of the moving member (see Patent Literature 1). The circulation path molding has a holding section that extends along a loaded rolling-element rolling section, a return path configuring section that configures a return path, and a pair of direction-change path inner circumference configuring sections that configure the inner circumferential portions of a pair of direction-change paths. The holding section holds the rolling elements or a holder that holds the rolling elements and plays a role of preventing them from falling from the moving member.

In the motion guide device described in Patent Literature 1, the circulation path molding is divided into several sections in a state of being integrally molded with at least one connector out of four connectors ((1) a connector between the holding section and one direction-change path inner circumference configuring section, (2) a connector between one direction-change path inner circumference configuring section and the return path configuring section, (3) a connector between the return path configuring section and the other direction-change path inner circumference configuring section, and (4) a connector between the other direction-change path inner circumference configuring section and the holding section) that configure a resin circulation path molding. Further, three modes are provided as modes of continuity for the connectors of the circulation path molding. First one is a mode in which the holding section and the pair of direction-change path inner circumference configuring sections are integrally molded, and the return path configuring section is separately provided. The second one is a mode in which one direction-change path inner circumference configuring section is integrally molded with the holding section and the return path configuring section, and the other direction-change path inner circumference configuring section is separately provided. The third one is a mode in which the holding section and the return path configuring section are integrally molded with the pair of direction-change path inner circumference configuring sections, and the holding section and the return path configuring section are divided into two halfway in a longitudinal direction.

According to the motion guide device described in Patent Literature 1, the integral molding of at least one connector can ensure the continuity of the circulation path molding and exert an effect of enabling smooth circulation of the rolling elements. In addition, the division of the circulation path molding into two, that is a minimum number of divisions, exerts an effect of facilitating assemblage of the circulation path molding.

CITATION LIST

Patent Literature

Patent Literature 1: JP H11-072119 A

SUMMARY OF THE INVENTION

Technical Problem

However, in the first mode, the return path configuring section is required to be inserted between the pair of direction-change path inner circumference configuring sections having a predetermined distance therebetween and thus raises a problem in assembling properties. The second mode raises a problem in moldability in integrally molding, with accuracy, the holding section and the return path configuring section into one direction-change path inner circumference configuring section. The third mode raises a problem in assembling properties in accurately connecting the holding section and the return path configuring section which are divided into two halfway in a longitudinal direction.

In this regard, the present invention has as its object to provide a motion guide device including a moving member that is provided with a circulation path molding, which device is able to improve assembling properties and moldability.

Solution to Problem

To solve the problems set forth above, the present invention provides a motion guide device comprising: a track member having a rolling-element rolling section; and a moving member movably assembled to the track member via a plurality of rolling elements and having a circulation path that includes a loaded rolling-element rolling section opposed to the rolling-element rolling section of the track member, a return path parallel to the loaded rolling-element rolling section, and a pair of direction-change paths connected to the return path and a loaded rolling-element rolling path provided between the rolling-element rolling section and the loaded rolling-element rolling section, the moving member being provided with a circulation path molding having a holding section that extends along the loaded rolling-element rolling section, a return path configuring section that configures the return path, and a pair of direction-change path inner circumference configuring sections that configure inner circumferential portions of the pair of direction-change paths, wherein: the circulation path molding includes a first molding in which one direction-change path inner circumference configuring section is integrally molded with the holding section, and a second molding in which the other direction-change path inner circumference configuring section is integrally molded with the return path configuring section; and the first molding and the second molding are separate bodies.

Advantageous Effects of the Invention

According to the present invention, the circulation path molding is configured by the first molding in which one direction-change path inner circumference configuring section is integrally molded with the holding section, and the second molding in which the other direction-change path inner circumference configuring section is integrally molded with the return path configuring section. Accordingly, assembling properties and moldability are improved.

DESCRIPTION OF EMBODIMENTS

Figure 1:
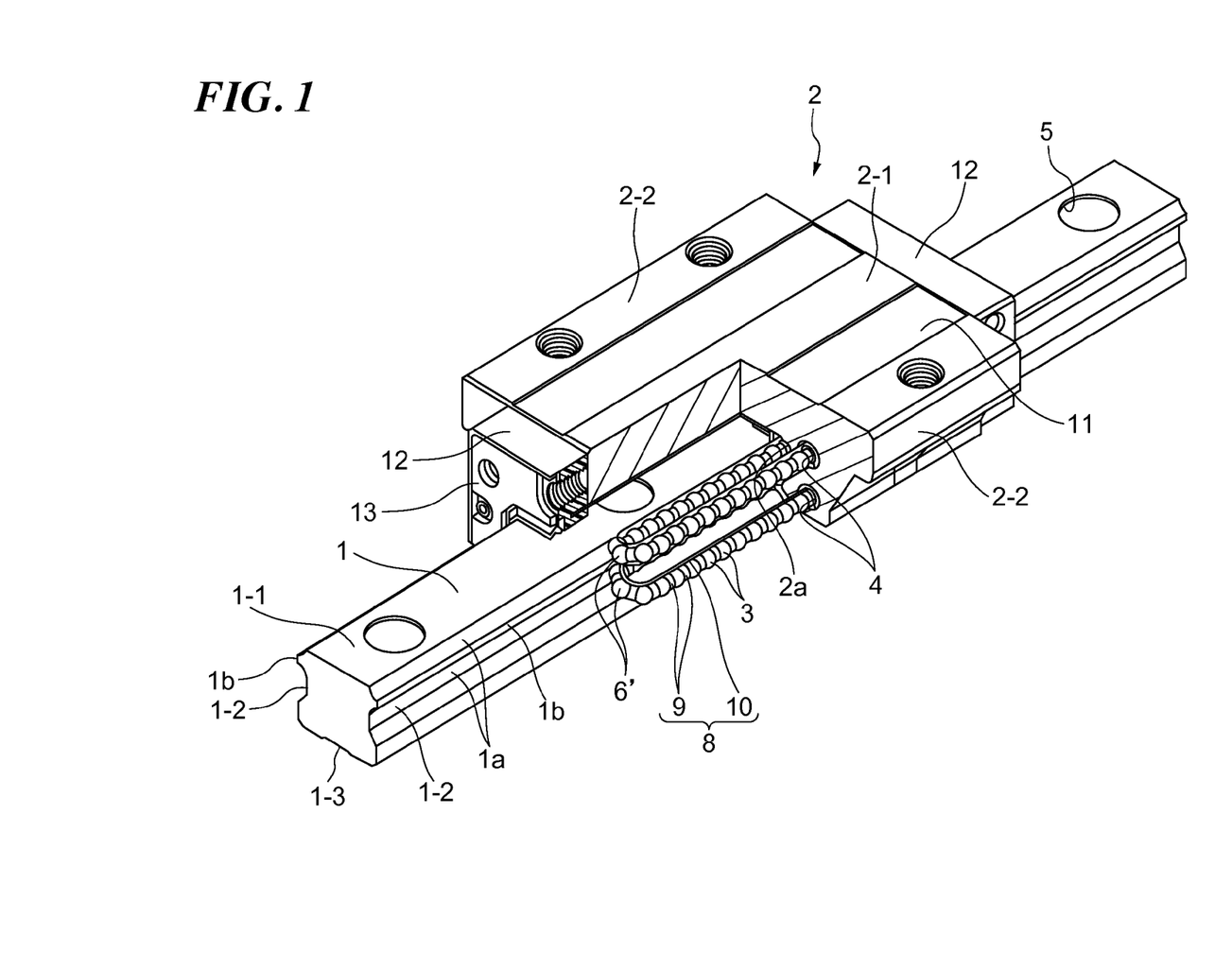
FIG. 1 is a perspective view (partially including a cross-sectional view) illustrating a linear guide that is a motion guide device, according to an embodiment of the present invention.
Figure 2:
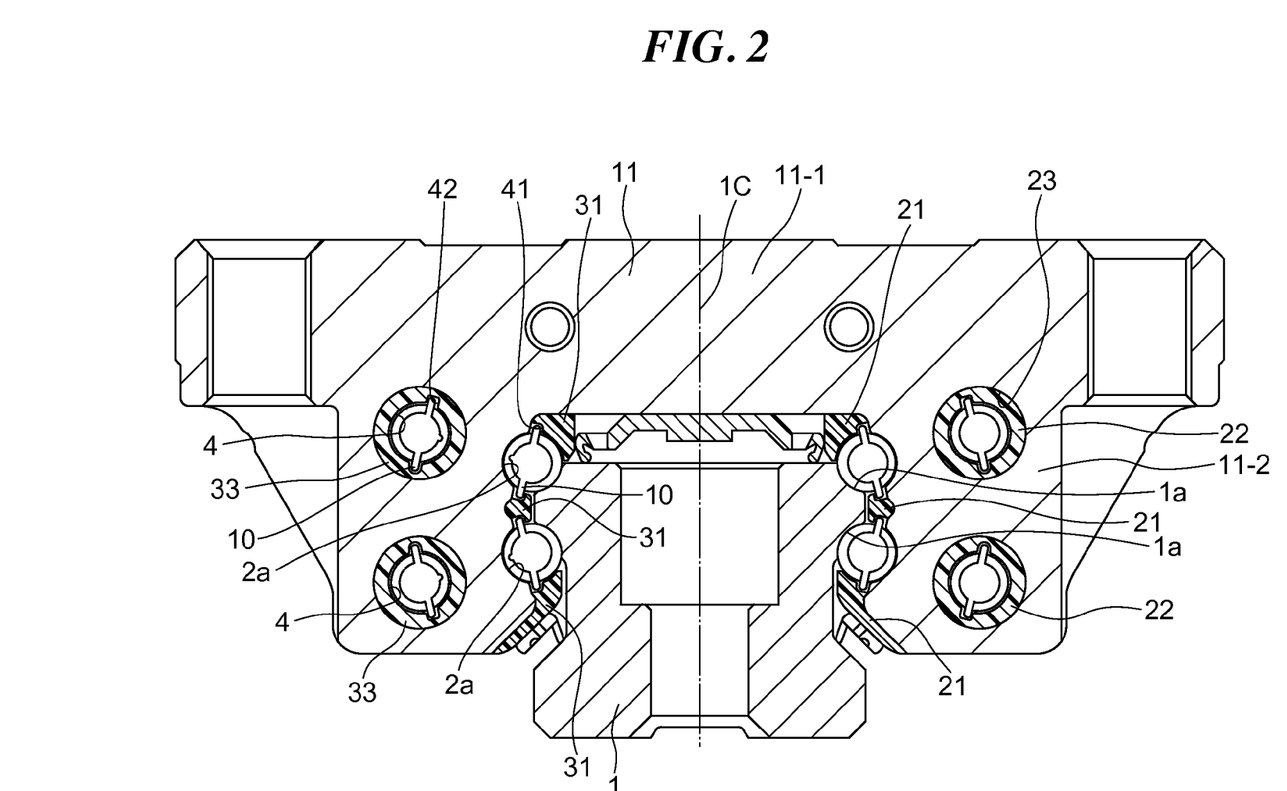
FIG. 2 is a cross-sectional view illustrating a motion guide device, according to the present embodiment.

With reference to the accompanying drawings, hereinafter is described a motion guide device according to an embodiment of the present invention. FIG. 1 is a perspective view and FIG. 2 is a cross-sectional view, illustrating the motion guide device of the present embodiment. The motion guide device includes a rail 1 as a track member which is linearly extended in a longitudinal direction, and a moving member 2 which is assembled to the rail 1 via a number of balls 3 as rolling elements to enable linear motion in a longitudinal direction. In the drawings, the components identical with each other are given the same reference signs.

As shown in FIG. 1, the rail 1 has a substantially square cross section and includes an upper surface 1-1, a pair of right and left side surfaces 1-2, and a bottom surface 1-3. At each of intersections where the upper surface 1-1 meets the pair of right and left side surfaces 1-2, a projection 1b is formed, being projected in the right-and-left direction and extended in a longitudinal direction. The projection 1b has an upper surface and a lower surface each of which is formed with a ball rolling groove 1a as a rolling-element rolling section extending in a longitudinal direction. The ball rolling groove 1a is provided by two rows on each of the right and the left, totaling in four rows, sandwiching a center line 1c of the rail 1 in a width direction. The position and the number of rows of the ball rolling grooves 1a can be appropriately determined in accord with the direction and the size of a load (vertical load, horizontal load and moment load) received by the motion guide device. For example, one row may be provided to the upper surface of the rail 1 and one row may be provided to a side surface thereof, or two rows may be provided to a side surface of the rail 1. As shown in FIG. 1, a plurality of through holes 5 are formed in the upper surface of the rail 1 so as to be mutually spaced apart in a longitudinal direction. In the through holes 5, respective bolts are inserted to fix the rail 1 to a base.

As shown in FIG. 1, the moving member 2 assembled to the rail 1 is formed into a saddle-like shape by being provided with a center portion 2-1 which is opposed to the upper surface 1-1 of the rail 1, and a pair of right and left sleeve portions 2-2 which vertically droop from both end portions of the center portion 2-1 in a width direction so as to be opposed to the pair of right and left side surfaces 1-2 of the rail 1. The moving member 2 is provided with circulation paths which include linear loaded ball rolling grooves 2a each of which is opposed to a corresponding one of the ball rolling grooves 1a of the rail 1, linear return paths 4 which are parallel to the loaded ball rolling grooves 2a, and pairs of U-shaped direction-change paths 6 (see FIG. 8, direction-change portions of a holder 8 are indicated in FIG. 1 by 6') connected to the return paths 4 and loaded ball rolling paths each provided between a corresponding one of the ball rolling grooves 1a and a corresponding one of the loaded ball rolling grooves 2a. The number of the circulation paths is equal to the number of the ball rolling grooves 1a of the rail 1. The circulation path is provided by two rows on each of the right and the left, totaling in four rows, sandwiching the center line c1 of the moving member 2 in a width direction.

Numerous balls 3 as rolling elements are arrayed and accommodated in the circulation path. The numerous balls 3 are connected in series by a holder 8. The holder 8 includes spacers 9 each interposed between the balls 3, and a band 10 connecting the spacers 9. The band 10 of the holder 8 extends outside the balls 3 in an array direction of the balls 3.

As shown in the cross-sectional view of FIG. 2, the moving member 2 includes a moving block 11 made of metal and lying in the center in a moving direction, circulation path moldings 21 and 22 made of a resin and incorporated into the moving block 11, and a pair of cover members 12 (see FIG. 1) made of a resin and mounted to both end faces of the moving block 11 in a moving direction. The moving block 11 includes a center portion 11-1 which is opposed to the upper surface of the rail 1, and a pair of right and left sleeve portions 11-2 which are opposed to the respective side surfaces of the rail 1. The sleeve portions 11-2 of the moving block 11 are each formed with upper and lower two rows of loaded ball rolling grooves 2a opposed to the respective ball rolling grooves 1a of the rail 1. Further, each sleeve portion 11-2 of the moving block 11 is formed with a through hole 23 parallel to the loaded ball rolling groove 2a.

The circulation path moldings 21 and 22 include a holding section 31 (see FIG. 3) which extends along both sides of the loaded ball rolling groove 2a of the moving block 11, a return path configuring section 33 (see FIG. 3) which is inserted into the through hole 23 of the moving block 11 to configure the return path 4, and a pair of direction-change path inner circumference configuring sections 32 and 34 (see FIG. 3) which are provided to both end faces of the moving block 11 in a moving direction to configure inner circumferential portions of the pair of direction-change paths 6.

The holding section 31 is provided to both side edges of the loaded ball rolling groove 2a and plays a role of holding the balls 3 or the holder 8 that holds the balls 3. In the present embodiment, the loaded ball rolling groove 2a of the moving block 11 is provided by two rows, upper and lower, in each sleeve portion 11-2 of the moving block 11, with the vertically center of the holding section 31 being shared between the two upper and lower rows of the loaded ball rolling grooves 2a. The holding section 31 is provided with a guide groove 41 that guides the band 10 of the holder 8. The holding section 31 prevents the holder 8 from wobbling when the balls 3 make a rolling motion, while preventing the balls 3 from dropping off from the moving member 2 when the moving member 2 is detached from the rail 1. It should be noted that when the holder 8 does not have a function of holding the balls 3 or when the holder 8 is not provided, the holding section 31 is ensured to directly hold the balls 3.

The return path configuring section 33 is formed into a cylindrical shape. The return path configuring section 33 is formed with a guide groove 42 that guides the band 10 of the holder 8. The direction-change path inner circumference configuring sections 32 and 34 (see FIG. 3) are mounted to both end faces of the moving block 11 in a moving direction to configure the inner circumferential portions of the direction-change paths 6.

Figure 3:
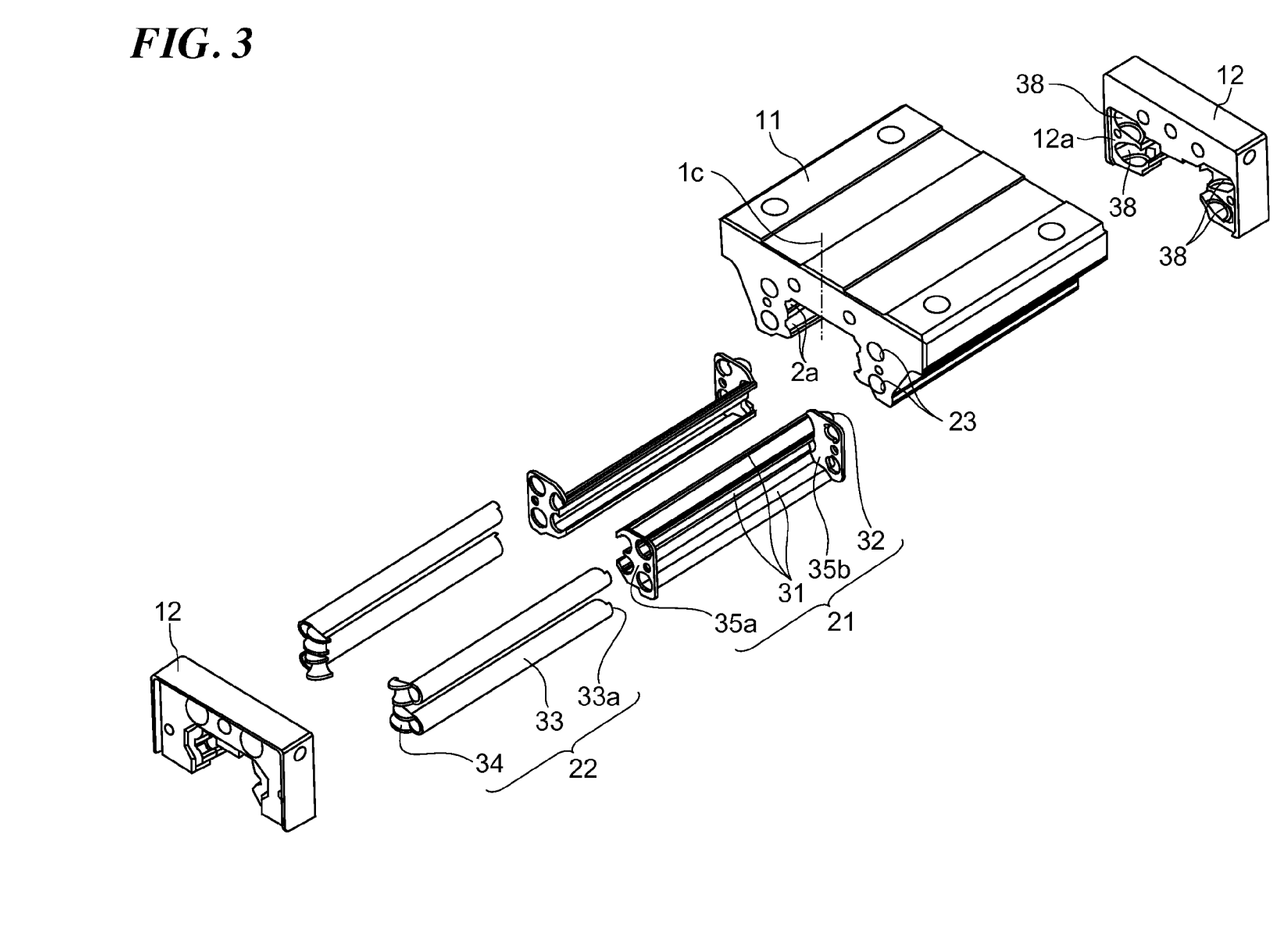
FIG. 3 is a perspective exploded view illustrating a moving member of the motion guide device, according to the present embodiment.

As shown in the exploded perspective view of the moving member 2 of FIG. 3, the circulation path moldings 21 and 22 include a first molding 21 obtained by integrally molding one direction-change path inner circumference configuring section 32 with the holding section 31 throughout its length, and a second molding 22 obtained by integrally molding the other direction-change path inner circumference configuring section 34 with the return path configuring section 33 throughout its length. The first molding 21 and the second molding 22 are separate bodies and incorporated into the moving block 11. Detailed structures of the circulation path moldings 21 and 22 are described later.

The cover members 12 are mounted to both end faces of the moving block 11 in a moving direction by means of bolts or the like. Each cover member 12 is provided with a recess 12a to which a plate 35a or 35b of the first molding 21 described later is fitted. The recess 12a of the cover member 12 is provided with a direction-change path outer circumference configuring section 38 that configures an outer circumferential portion of the direction-change path 6. The direction-change path inner circumference configuring section 32 or 34 formed of a projection having a semicircular cross section is fitted to the direction-change path outer circumference configuring section 38 formed of a recess having a semicircular cross section. The direction-change path 6 is formed between the direction-change path outer circumference configuring section 38 of the cover member 12 and the direction-change path inner circumference configuring section 32 or 34 and, at the same time, a guide groove 43 for guiding the band 10 of the holder 8 is formed (see FIG. 8). The cover member 12 is mounted with a seal member 13 which prevents entry of foreign matters into the moving member 2 or prevents leakage of a lubricant inside the moving member 2 to the outside (see FIG. 1).

As shown in FIG. 3, two first moldings 21 are provided in the present embodiment. Two first moldings 21 are provided on the right and the left of the center line 1c of the moving member 2 so as to be bilaterally symmetric about the center line 1c. Each first molding 21 is provided with the direction-change path inner circumference configuring section 32 and the holding section 31 corresponding to two rows. The direction-change path inner circumference configuring section 32 is formed into a semi-columnar shape (see FIG. 7(*b*)). The direction-change path inner circumference configuring section 32 is circumferentially formed with a groove having a semicircular cross section. Both side edges of the groove play a role of guiding the band 10 of the holder 8. As shown in FIG. 3, the holding section 31 is elongated and has a constant cross section. The holding section 31 is formed with the guide groove 41 (see FIG. 2) that guides the band 10 of the holder 8.

The first molding 21 is integrally formed with a pair of plates 35a and 35b which are in contact with both end faces of the moving block 11 in a moving direction. The direction-change path inner circumference configuring section 32 and the holding section 31 are integrally connected to each other via the plate 35b. Two direction-change path inner circumference configuring sections 32 of the first molding 21 are provided to one end face of the moving block 11 (the right side end face in FIG. 3). A total of four direction-change path inner circumference configuring sections 32 of the two first moldings 21 are provided to one end face of the moving block 11 in a moving direction.

The number of the second moldings 22 is four. The four second moldings 22 are provided such that two are located on each of the right and the left of the center line 1c of the moving member 2. Two second moldings 22 are incorporated into one first molding 21. Each second molding 22 is provided with the direction-change path inner circumference configuring section 34 and the return path configuring section 33 corresponding to one row. A total of four direction-change path inner circumference configuring sections 34 of the four second moldings are provided to the other end face (the left side end face in FIG. 3) of the moving block 11.

Figure 4:
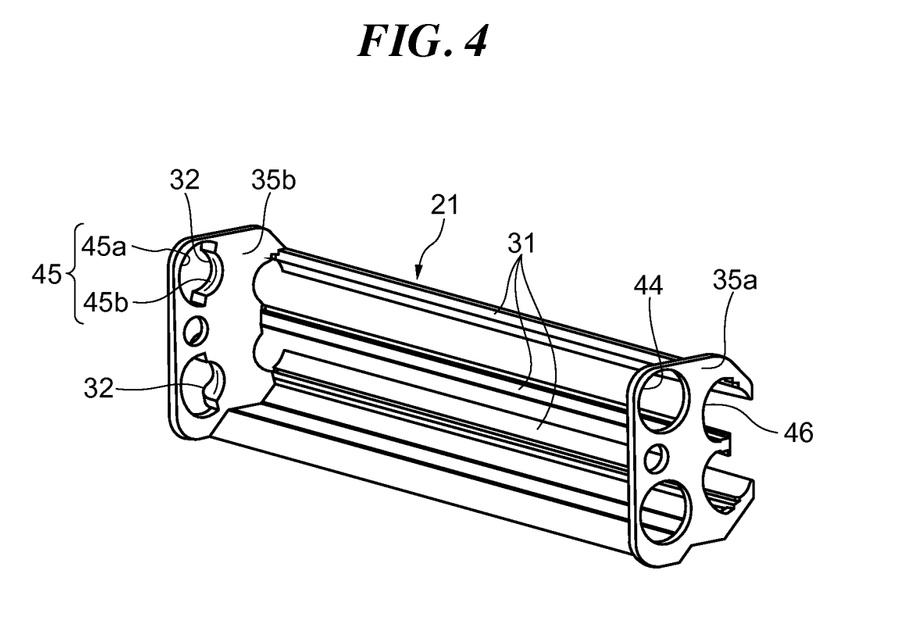
FIG. 4 is a perspective view illustrating a first molding.

FIG. 4 shows details of the first molding 21. The pair of plates 35a and 35b are formed with through holes 44 and 45, respectively, through which the return path configuring section 33 of the second molding 22 is passed. The through hole 44 of one plate 35a is formed into a circular shape. The through hole 45 of the other plate 35b is formed into a variant of a circle which is a combination of a small-diameter semicircle 45b and a large-diameter semicircle 45a.

One plate 35a is formed with an arc-shaped cut 46 near the holding section 31. The cut 46 is fitted with an arc-shaped positioning portion 34a (see FIGS. 5(a) and 5(b)) which is formed on a back surface of the direction-change path inner circumference configuring section 34 of the second molding 22. The arc-shaped positioning portion 34a prevents the second molding 22 from rotating about the return path configuring section 33 relative to the first molding 21.

As mentioned above, the other plate 35b is formed with the through hole 45 of a variant of a circle. The through hole 45 is fitted with an end portion 33a (see FIGS. 5(a) and 5(b)) of the return path configuring section 33 of the second molding 22. The end portion 33a is formed with an outer circumference side positioning portion 33a2 and an inner circumference side positioning portion 33a1 with a step being formed therebetween in a longitudinal direction of the return path configuring section 33. The outer circumference side positioning portion 33a2 is fitted to the large-diameter circle 45a of the other plate 35b. The inner circumference side positioning portion 33a1 is abutted against the other plate 35b and connected to the small-diameter circle 45b. The end portion 33a of the return path configuring section 33 of the second molding 22 prevents the second molding 22 from rotating about the return path configuring section 33 relative to the first molding 21.

Figure 5A:
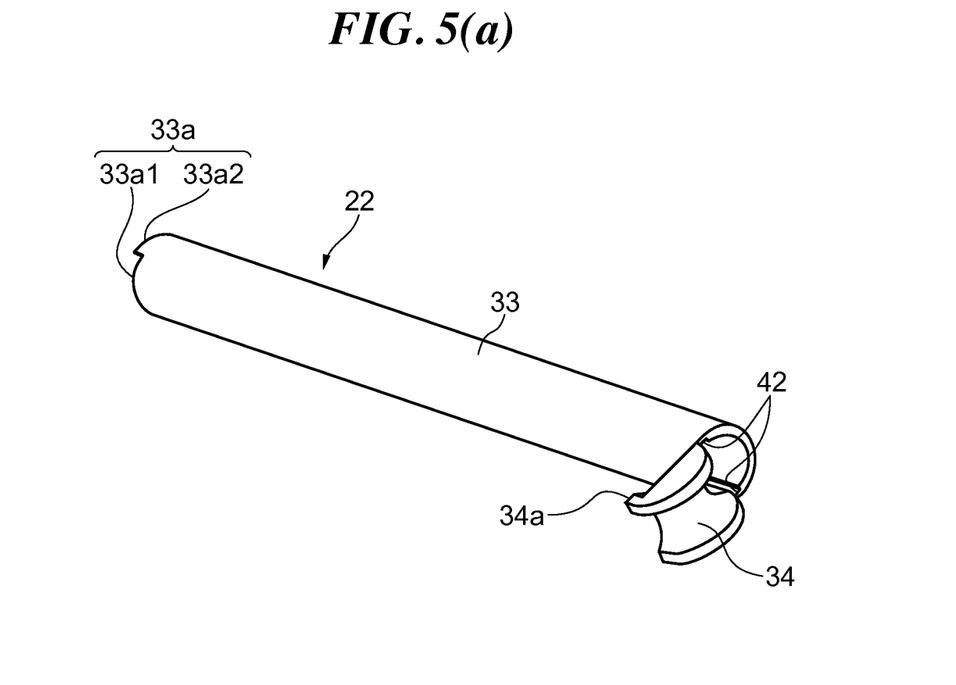
FIGS. 5(a) and 5(b) are perspective views illustrating a second molding (FIGS. 5(a) and 5 (b) show perspective views as viewed from mutually opposite directions)
Figure 5B:
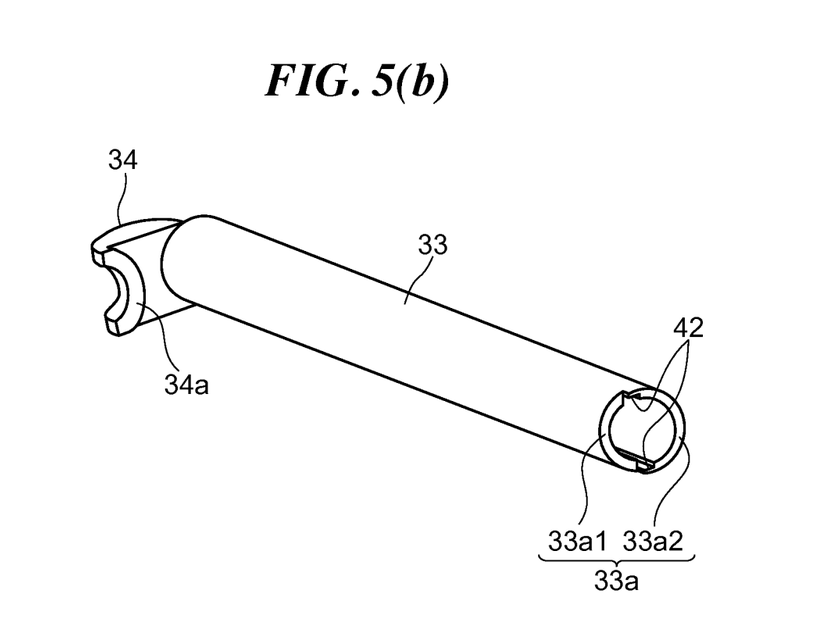

FIGS. 5(a) and 5(b) show details of the second molding 22. The second molding 22 is configured by integrally molding the direction-change path inner circumference configuring section 34 with the return path configuring section 33 throughout its length. The direction-change path inner circumference configuring section 34 is formed into a semi-columnar shape. The direction-change path inner circumference configuring section 34 is circumferentially formed with a groove having a semicircular cross section. Both side edges of the groove play a role of guiding the band 10 of the holder 8. As mentioned above, the arc-shaped positioning portion 34a is formed on the back surface of the direction-change path inner circumference configuring section 34.

Figure 6:
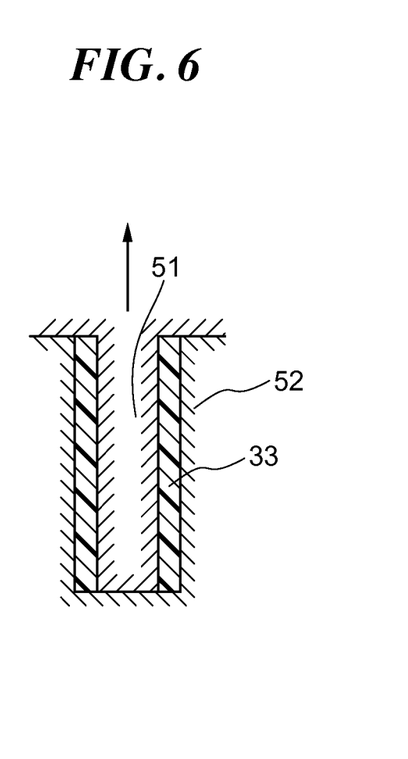
FIG. 6 is a schematic diagram illustrating a metal mold for molding a return path configuring section of the second molding.

The return path configuring section 33 is formed into a cylindrical shape throughout its length. The return path configuring section 33 has an inner peripheral surface in which the guide groove 42 is formed, being extended in a longitudinal direction, throughout the length of the inner peripheral surface. The guide groove 42 guides the band 10 of the holder 8. The end portion 33a of the return path configuring section 33 is formed with the outer circumference side positioning portion 33a2 and the inner circumference side positioning portion 33a1 with a step being formed therebetween in a longitudinal direction. As shown in FIG. 6, the return path configuring section 33 is molded by means of metal molds 51 and 52 having a draft angle of zero degree. The draft angle of zero degree refers to that no draft angle is formed for pulling out the movable side metal mold 51. The pullout direction of the movable side metal mold 51, the inner peripheral surface of the cavity, and the outer peripheral surface of the core are parallel to each other.

Figure 7A:
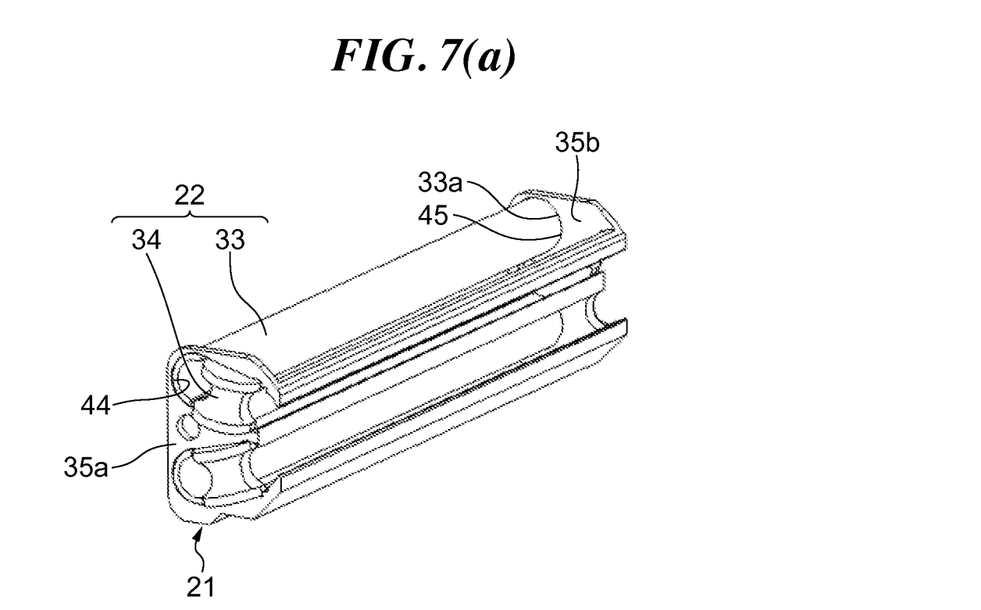
FIGS. 7(a) and 7(b) are perspective views illustrating the first molding and the second molding as combined (FIGS. 7(a) and 7(b) show perspective views as viewed from mutually opposite directions)
Figure 7B:
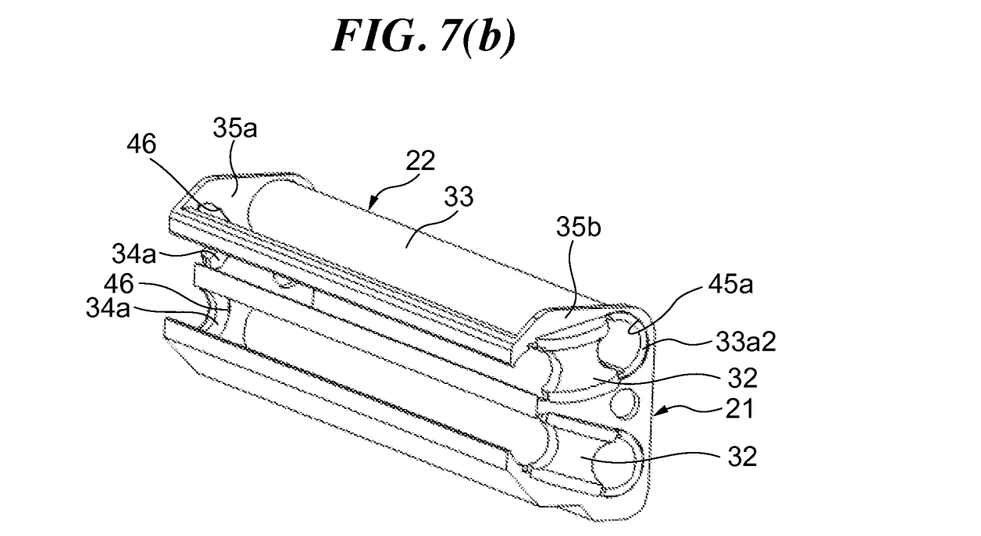

FIGS. 7(a) and 7(b) show a state where the first and second moldings 21 and 22 are combined. As shown in FIG. 7(a), the return path configuring section 33 of the second molding 22 is passed through the through holes 44 and 45 of the pair of plates 35a and 35b, respectively, of the first molding 21 to thereby assemble the first and second moldings 21 and 22. The end portion 33a of the return path configuring section 33 of the second molding 22 is positioned on the plate 35b of the first molding 21. The direction-change path inner circumference configuring section 34 of the second molding 22 is positioned on the plate 35a. The outer circumference side positioning portion 33a2 (see FIG. 7(b)) of the return path configuring section 33 of the second molding 22 is fitted to the large-diameter circle 45a (see FIG. 4) of the plate 35b of the first molding 21. The outer circumference side positioning portion 33a2 has an end which is flush with a surface of the plate 35b. As shown in the cross-sectional view of FIG. 8, the outer circumference side positioning portion 33a2 passes through the plate 35b of the first molding 21 to establish connection with the direction-change path outer circumference configuring section 38 of the cover member 12. The inner circumference side positioning portion 33a1 is in contact with the plate 35b of the first molding 21 to establish connection with the direction-change path inner circumference configuring section 32 of the first molding 21.

As shown in FIG. 7 (b), the arc-shaped positioning portion 34a of the direction-change path inner circumference configuring section 34 of the second molding 22 is fitted to the cut 46 of the plate 35a of the first molding 21. The arc-shaped positioning portion 34a has an end which is flush with a surface of the plate 35a of the first molding 21. As shown in the cross-sectional view of FIG. 8, the arc-shaped positioning portion 34a passes through the plate 35a of the first molding 21 to establish connection with the loaded ball rolling groove 2a of the moving block 11. The return path configuring section 33 of the second molding 22 has an outer circumference side which passes through the plate 35a to establish connection with the direction-change path outer circumference configuring section 38 of the cover member 12.

Figure 9A:
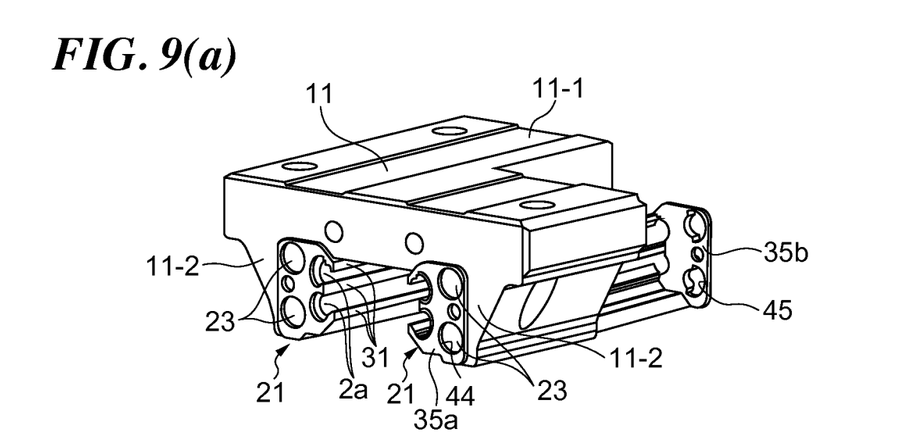
FIGS. 9(a) to 9(c) are process charts illustrating an assembling method for the moving member of the linear guide, according to the present embodiment (FIG. 9(a) shows a step where the first moldings have been mounted to a moving block, FIG. 9(b) shows a step of inserting the second moldings into through holes of the moving block, and FIG. 9(c) shows a step where the first and second moldings have been mounted to the moving block)

FIGS. 9(a) to 10(b) are process charts illustrating an assembling method for the moving member 2. As shown in FIG. 9(a), the two first moldings 21 are mounted, first, to the respective two sleeve portions 11-2 of the moving block 11. The holding section 31 of each first molding 21 is positioned relative to the loaded ball rolling groove 2a of the moving block 11. With the positioning, continuity is also ensured between the loaded ball rolling groove 2a of the moving block 11 and the direction-change path inner circumference configuring section 32 (see FIG. 3) of the first molding 21. When the first moldings 21 are mounted to the moving block 11, the pair of plates 35a and 35b of each first molding 21 are brought into contact with both end faces of the moving block 11 in a moving direction. The positions of the through holes 44 and 45 of the pair of plates 35a and 35b, respectively, align with the position of the through hole 23 of the moving block 11. The two first moldings 21 are formed so as to be bilaterally symmetric about the center line of the moving block 11. Accordingly, a total of four direction-change path inner circumference configuring sections 32 (see FIG. 3) are arranged at one end face (deep side end face) of the moving block 11 in a moving direction.

Figure 9B:
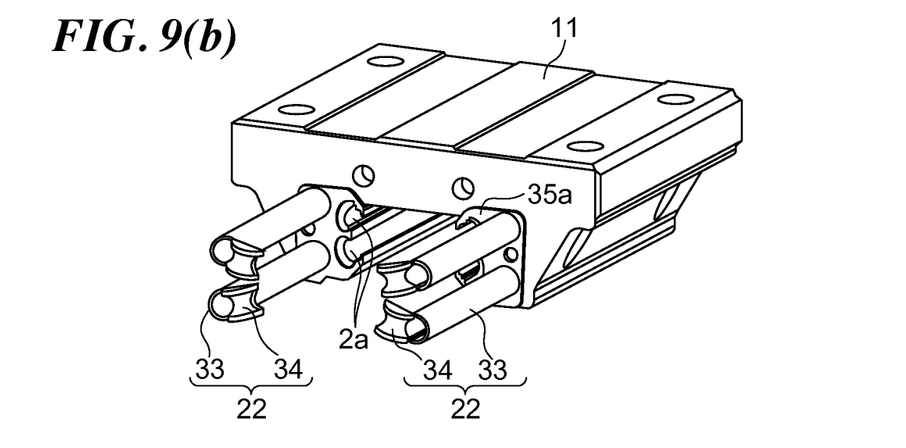
Figure 9C:
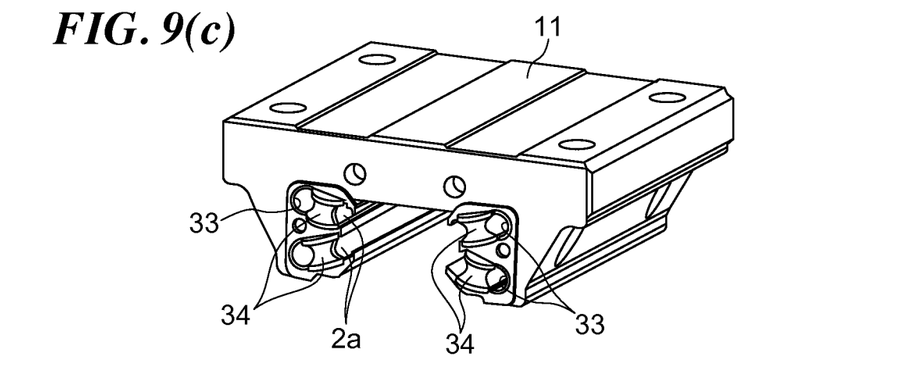

Then, as shown in FIG. 9(b), the return path configuring section 33 of each second molding 22 is inserted into the through holes 44 and 45 of the pair of plates 35a and 35b of the first molding 21 and the through hole 23 of the moving block 11. Since the total of four direction-change path inner circumference configuring sections 32 (see FIG. 3) of the first moldings 21 are arranged at one end face of the moving block 11 in a moving direction, the four second moldings 22 can be passed in one direction from the other end face side of the moving block 11. When each of the second moldings 22 is inserted into the through holes 44, 45 and 23, the end portion 33a of the return path configuring section 33 of the second molding 22, and the direction-change path inner circumference configuring section 34 of the second molding 22 are positioned on the pair of plates 35a and 35b of the first molding 21. As shown in FIG. 9(c), with the positioning, continuity is ensured between each loaded ball rolling groove 2a of the moving block 11 and the direction-change path inner circumference configuring section 34 of the second molding 22, and continuity is ensured between each return path configuring section 33 and the direction-change path inner circumference configuring section 32 of the first molding 21.

Figure 10A:
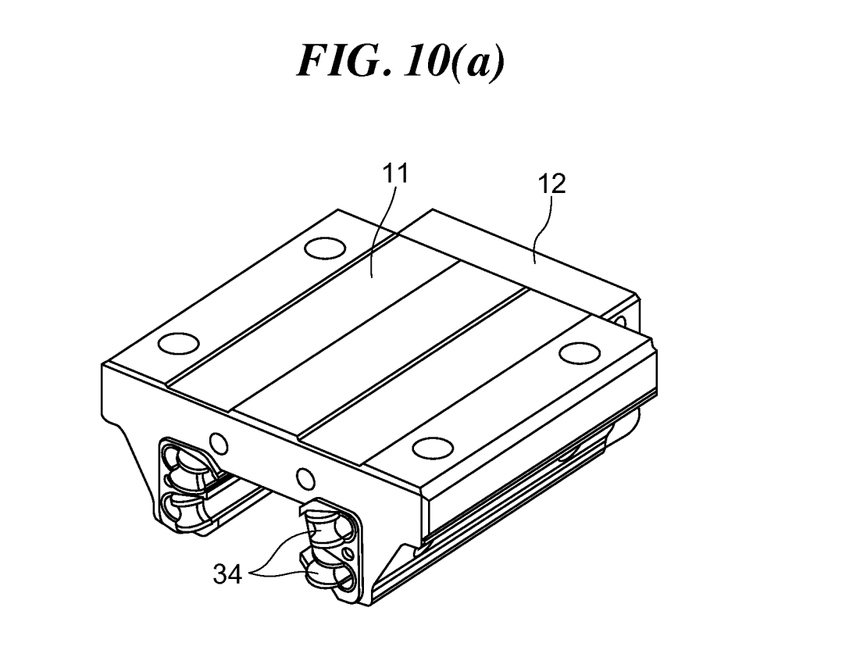
FIGS. 10(a) and 10(b) are process charts illustrating an assembling method for the moving member of the linear guide, according to the present embodiment (FIG. 10(a) shows a step where one cover member has been mounted to the moving block, and FIG. 10 (b) shows a step where a pair of cover members have been mounted to the moving block)

Then, as shown in FIG. 10(a), the cover member 12 is mounted to an end face of the moving block 11 in a moving direction. The cover member 12 is positioned relative to the direction-change path inner circumference configuring sections 32 of the first moldings 21. At this step, the balls 3 held by the holder 8 are inserted into the circulation path.

Figure 10B:
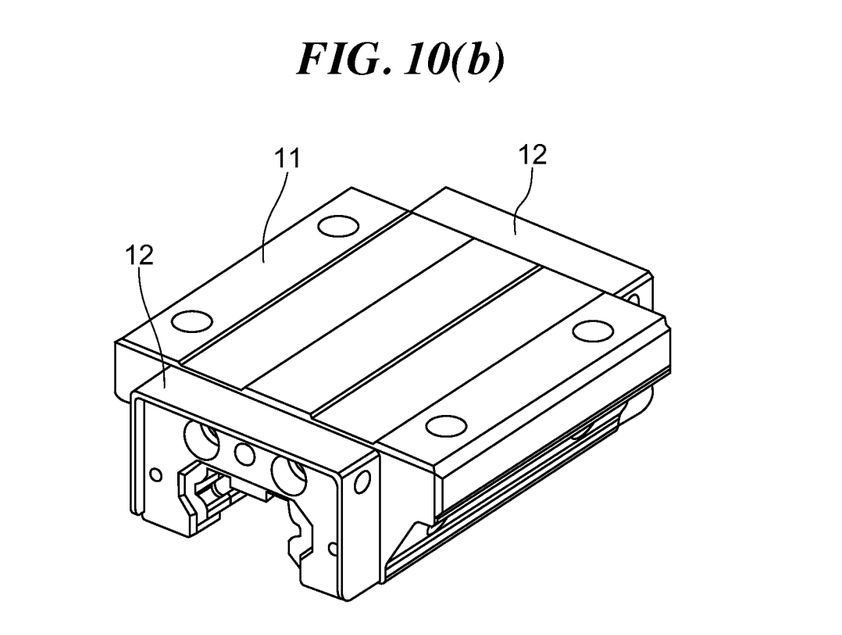

Finally, as shown in FIG. 10(b), the remaining cover member 12 is mounted to an end face of the moving block 11 in a moving direction. The cover member 12 is positioned relative to the direction-change path inner circumference configuring sections 34 of the first moldings 21. The moving member 2 is assembled in this way.

Figure 11:
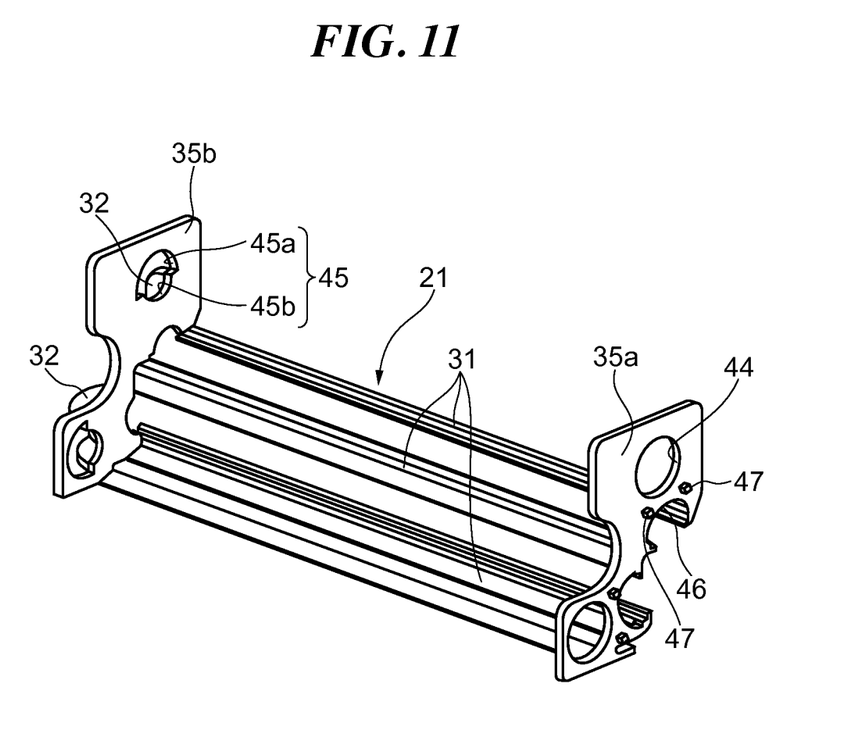
FIG. 11 is a perspective view illustrating another example of the first molding.
Figure 12A:
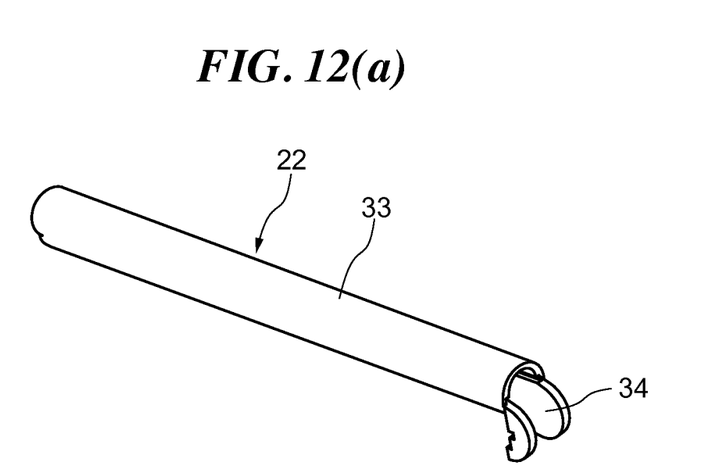
FIG. 12 is a perspective view illustrating another example of the second molding.
Figure 12B:
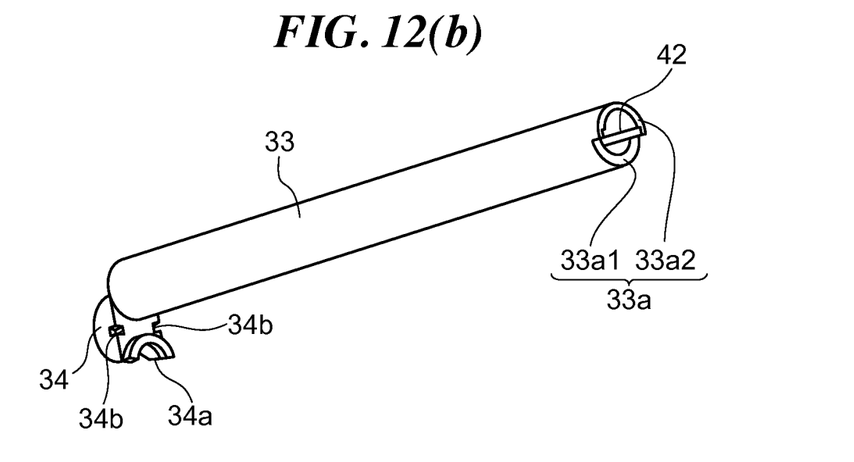

FIG. 11 shows another example of the first molding 21, and FIG. 12 shows another example of the second molding 22. As shown in FIG. 11, in the first molding 21 of this example, a plurality of projections 47 are formed on one plate 35a. As shown in FIG. 12, in the second molding 22 of this example, a plurality of recessed positioning portions 34b are formed on a back surface of the direction-change path inner circumference configuring section 34. The projections 47 of the first molding 21 are fitted to the recessed positioning portions 34b of the second molding 22. The recessed positioning portions 34b and the projections 47 are additionally provided positioning portions to prevent the second molding 22 from rotating about the return path configuring section 33 relative to the first molding 21. Since the rest of the configuration of the first molding 21 is similar to the first molding 21 shown in FIG. 4, the same reference signs are designated to omit the description. Since the rest of the configuration of the second molding 22 is also similar to the molding 22 shown in FIGS. 5(a) and 5(b), the same reference signs are designated to omit the description.

The configuration of the motion guide device according to the present embodiment has so far been described. According to the motion guide device of the present embodiment, the following advantageous effects are obtained.

As shown in FIG. 3, the circulation path moldings 21 and 22 are configured by the first molding 21 in which one direction-change path inner circumference configuring section 32 is integrally molded with the holding section 31, and the second molding 22 in which the other direction-change path inner circumference configuring section 34 is integrally molded with the return path configuring section 33. Accordingly, assembling properties and moldability are improved. The assembling work that has been manually conducted can be automated.

The return path configuring section 33 of the second molding 22 is formed into a cylindrical shape. Accordingly, it is no longer necessary to combine pipes which are divided into two along a direction of a center line, thereby improving assembling properties.

As shown in FIGS. 5(a) and 5(b), the positioning portions 33a1, 33a2 and 34a are provided to the end portion 33a of the return path configuring section 33 of the second molding 22 and to the direction-change path inner circumference configuring section 34 of the second molding 22. Accordingly, the second molding 22 can be accurately positioned relative to the first molding 21, at both end portions of the second molding 22 in a longitudinal direction. Thus, the step caused at a joint between the first and second moldings 21 and 22 can be made as small as possible for smooth circulation of the holder 8 and the balls 3.

As shown in FIG. 4, the first molding 21 is provided with the pair of plates 35a and 35b, and the second molding 22 is positioned on the pair of plates 35a and 35b. Thus, the second molding 22 can be easily positioned relative to the first molding 21.

As shown in FIGS. 9(a) to 9(c), the return path configuring section 33 of each second molding 22 is inserted into at least one of the through holes 44 and 45 of the pair of plates 35a and 35b of the first molding 21, so that the second molding 22 is positioned relative to the first molding 21.

Figure 8:
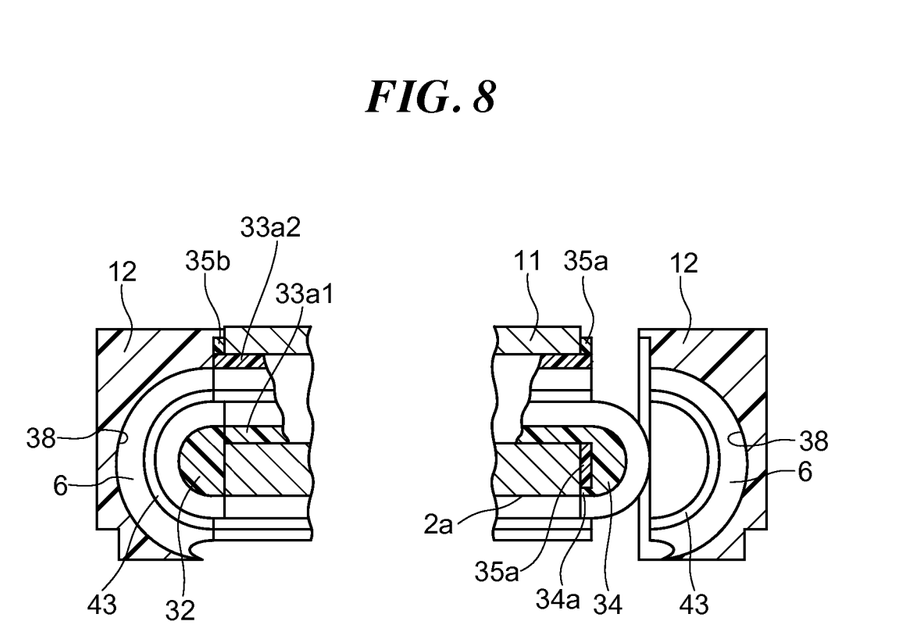
FIG. 8 is a cross-sectional view illustrating the moving member along a circulation path.

As shown in FIG. 8, the semicircular positioning portion 34a of the direction-change path inner circumference configuring section 34 of the second molding 22 is passed through the plate 35a of the first molding 21 to establish connection with the loaded ball rolling groove 2a of the moving block 11. Accordingly, continuity can be ensured between the direction-change path inner circumference configuring section 34 of the second molding 22 and the loaded ball rolling groove 2a of the moving block 11.

As shown in FIG. 8, the outer circumference side positioning portion 33a2 of the return path configuring section 33 of the second molding 22 is passed through the plate 35b of the first molding 21 to establish connection with the direction-change path outer circumference configuring section 38 of the cover member 12. Accordingly, continuity can be ensured between the return path configuring section 33 of the second molding 22 and the direction-change path outer circumference configuring section 38 of the cover member 12. The inner circumference side positioning portion 33a1 of the return path configuring section 33 of the second molding 22 is brought into contact with the plate 35b of the first molding 21 to establish connection with the direction-change path inner circumference configuring section 32 of the first molding 21. Accordingly, continuity can be ensured between the return path configuring section 33 of the second molding 22 and the direction-change path inner circumference configuring section 32 of the first molding 21.

As shown in FIG. 6, the return path configuring section 33 of the second molding 22 is molded by means of the metal molds 51 and 52 having a draft angle of zero degree. Accordingly, the cylindrical return path configuring section 33 can be molded with high accuracy.

As shown in FIG. 3, the two direction-change path inner circumference configuring sections 32 of the first molding 21 are provided to one end face of the moving block 11 in a moving direction. Accordingly, as shown in FIG. 9(b), the second molding 22 can be inserted from one direction of the moving block 11, thereby improving assembling properties. If a total of four direction-change path inner circumference configuring sections 32 of the two first moldings 21 are provided at one end face of the moving block 11 in a moving direction, all the second moldings 22 can be inserted from one direction of the moving block 11.

Description so far has been given on an embodiment in which the present embodiment is exemplified into a linear guide as the motion guide device. The present invention can be applied to not only a linear guide but also a spline device.

In an application to a spline device, a spline shaft is used as the track member. The spline shaft is formed with a plurality of spline grooves extending in a longitudinal direction. An outer cylinder enclosing the spline shaft is used as the moving member 2. The outer cylinder includes an outer cylinder block having a loaded ball rolling groove opposed to a spline groove, and a return path parallel to the loaded ball rolling groove, and includes a pair of cover members mounted to both end faces of the outer cylinder block in a moving direction. The outer cylinder is incorporated with a circulation path molding having a holding section extending along the loaded ball rolling groove, a return path configuring section configuring the return path, and a pair of direction-change path inner circumference configuring sections configuring inner circumferential portions of a pair of direction-change paths. The circulation path molding includes a first molding in which one direction-change path inner circumference configuring section is integrally molded with the holding section, and a second molding in which the other direction-change path inner circumference configuring section is integrally molded with the return path configuring section. Each cover member is provided with a direction-change path outer circumference configuring section that configures an outer circumferential portion of the direction-change path.

It should be noted that the present invention should not be construed as being limited to the exemplification with the foregoing embodiment, but can be exemplified with various embodiments within a scope not changing the spirit of the present invention.

In the foregoing embodiment, a number of balls are serially connected by a holder. However, the holder does not have to be necessarily used. In the case of a so-called integrated ball type motion guide device, no holder is used. There is no longer the necessity of providing a groove for guiding the band of a holder of a circulation path molding.

In the foregoing embodiment, the four second moldings are all separate bodies. However, the vertically located two second moldings may be integrally molded, or the four second moldings may all be integrally molded.

In the foregoing embodiment, the return path configuring section of the second molding is formed into a cylindrical shape. However, the return path configuring section may be molded into a half-split pipe shape. Although the assembling properties are diminished, the remaining half-split pipe may be assembled afterward.

In the foregoing embodiment, the plates are integrally molded into the first molding. However, the plates may be omitted.

In the foregoing embodiment, a recessed positioning portion is formed on a back surface of the direction-change path inner circumference configuring section of the second molding. However, the recessed positioning portion may be omitted.

The shape of the rail and the moving member, as well as the number of rows, the shape, the contact angle and the like of the ball rolling groove and the loaded ball rolling groove may be appropriately determined in accord with the load that should be received by the motion guide device. Instead of balls, rollers may be used as the rolling elements.

The invention claimed is:

1. A motion guide device comprising:
    a track member having a rolling-element rolling section; and
    a moving member movably assembled to the track member via a plurality of rolling elements and having a circulation path that includes a loaded rolling-element rolling section opposed to the rolling-element rolling section of the track member, a return path parallel to the loaded rolling-element rolling section, and a pair of direction-change paths connected to the return path and a loaded rolling-element rolling path provided between the rolling-element rolling section and the loaded rolling-element rolling section,
    the moving member being provided with a circulation path molding having a holding section that extends along the loaded rolling-element rolling section, a return path configuring section that defines the return path, and a pair of direction-change path inner circumference configuring sections that define inner circumferential portions of the pair of direction-change paths,
wherein:
    the circulation path molding includes a first molding in which one direction-change path inner circumference configuring section is integrally molded with the holding section, and a second molding in which the other direction-change path inner circumference configuring section is integrally molded with the return path configuring section; and
    the first molding and the second molding are separate bodies.

2. The motion guide device according to claim 1, characterized in that the return path configuring section of the second molding is formed into a cylindrical shape.

3. The motion guide device according to claim 2, characterized in that positioning portions that determine a position of the second molding relative to the first molding are provided to an end portion of the return path configuring section of the second molding and to the direction-change path inner circumference configuring section of the second molding.

4. The motion guide device according to claim 1, characterized in that positioning portions that determine a position of the second molding relative to the first molding are provided to an end portion of the return path configuring section of the second molding and to the direction-change path inner circumference configuring section of the second molding.

5. The motion guide device according to claim 4, characterized in that:
    the moving member includes a moving block having the loaded rolling-element rolling section;
    the first molding is integrally molded with a pair of plates that contact both end faces of the moving block in a moving direction;
    the direction-change path inner circumference configuring section of the second molding is positioned on one of the pair of plates of the first molding; and
    the end portion of the return path configuring section of the second molding is positioned in a through hole of the other of the pair of plates.

6. The motion guide device according to claim 5, characterized in that:
    the moving block includes a through hole; and
    the return path configuring section of the second molding is inserted into the through hole of the other of the pair of plates of the first molding and the through hole of the moving block.

* * * * *